United States Patent [19]

Bodenstein et al.

[11] Patent Number: 4,543,122
[45] Date of Patent: Sep. 24, 1985

[54] MAGNESIUM PRODUCTION

[75] Inventors: Johannes J. Bodenstein, Transvaal; Leslie J. Farrell, Johannesburg, both of South Africa

[73] Assignee: Johannesburg Consolidated Investment Company Limited, Transvaal, South Africa

[21] Appl. No.: 657,180

[22] Filed: Oct. 3, 1984

[30] Foreign Application Priority Data

Oct. 19, 1983 [ZA] South Africa .................. 83/7783

[51] Int. Cl.[4] ........................................ C22B 26/22
[52] U.S. Cl. ................................ 75/0.5 B; 75/24; 75/67 R
[58] Field of Search ............... 75/24, 67 R, 0.5 B

[56] References Cited

U.S. PATENT DOCUMENTS 4,190,434 2/1980 Bonfils et al. .......................... 75/24

FOREIGN PATENT DOCUMENTS 65225 11/1982 European Pat. Off. ............ 75/67 R

Primary Examiner—Melvyn J. Andrews
Attorney, Agent, or Firm—Burns, Doane, Swecker & Mathis

[57] ABSTRACT

Magnesium is recovered from a slag produced in a pyrometallurgical process and which contains magnesium oxide and other oxides. The slag is delivered, preferably in a hot state, to a reduction stage where the magnesium oxide is reduced and the magnesium vaporized. The reductant includes an alkaline earth metal in non-oxidic form, preferably calcium carbide. The vaporized magnesium is delivered to a condenser where it is condensed directly from the vapor state to a powder form.

12 Claims, 1 Drawing Figure

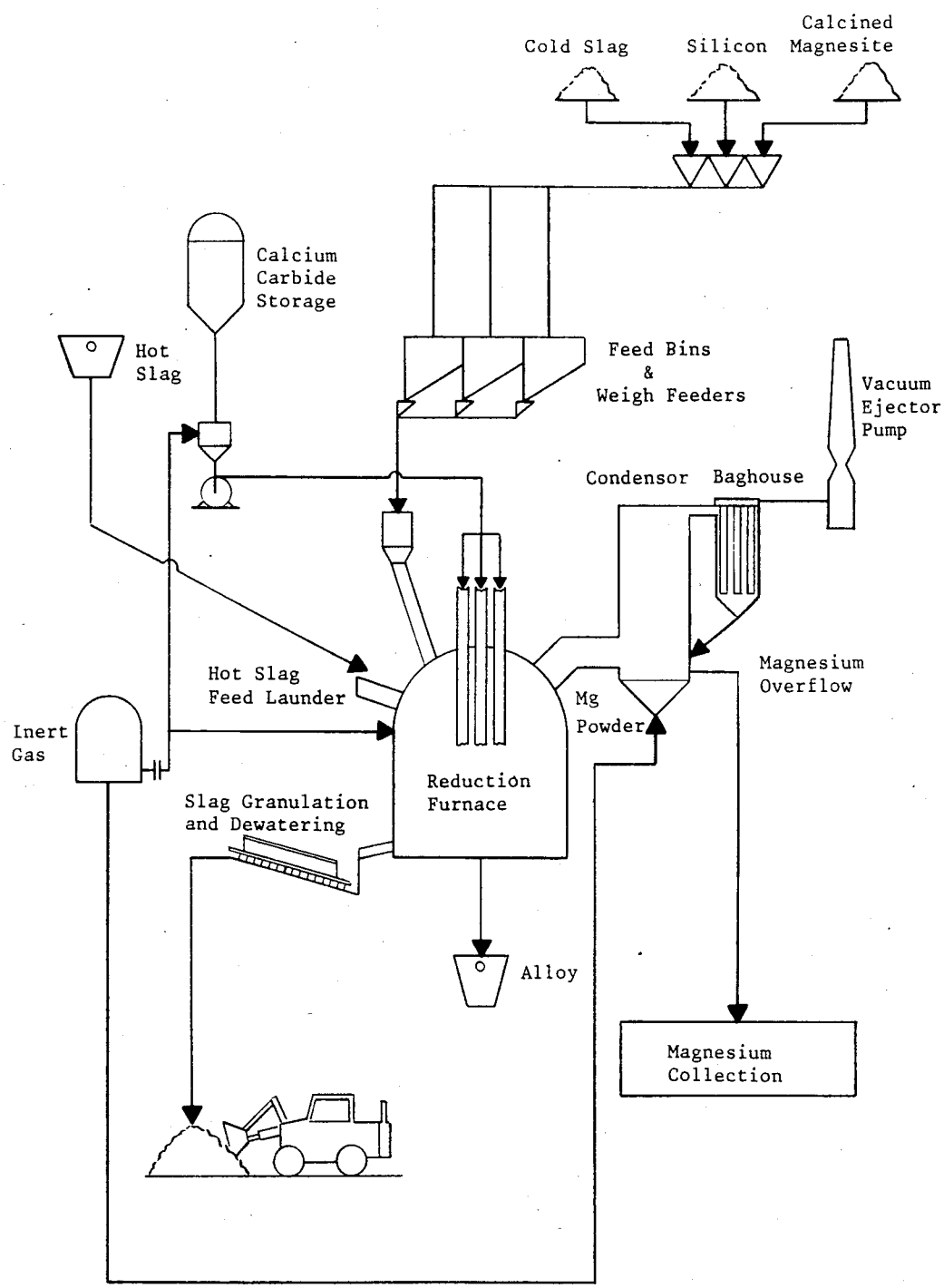

MAGNESIUM PRODUCTION

BACKGROUND OF THE INVENTION

This invention relates to magnesium production.

In many pyrometallurgical smelting processes, valuable alloys, metals or mattes are produced. Reject slag products are also produced. Often these slags contain a number of valuable metals, notably magnesium and aluminium. Examples of these slags are those produced in ferro-alloy smelting, in the recovery of platinum group metals and those produced in base metal smelting. The invention provides a method of recovering magnesium values, and optionally other metal values, from slags.

SUMMARY OF THE INVENTION

According to the present invention there is provided a method of recovering magnesium values from a material containing oxides of magnesium, chromium, aluminium, silicon, iron and calcium including the steps of heating the material in an inert atmosphere and in the presence of a reductant which includes an alkaline earth metal in non-oxidic form to reduce the magnesium oxide and produce vaporised magnesium and collecting the vaporised magnesium.

DESCRIPTION OF THE DRAWING

The drawing illustrates a flow diagram of an embodiment of the invention.

DETAILED DESCRIPTION OF THE INVENTION

The materials from which the magnesium values are recovered are slags produced in pyrometallurgical processes. Such slags are produced, for example, in the production of ferro-alloys, platinum group metals and other precious metals, and iron and steel. Examples of typical slag materials which can be used in the practice of the invention have one of the following compositions:

| Oxide | No. 1 Quantity (% by weight) | No. 2 Quantity (% by weight) |
|---|---|---|
| $Cr_2O_3$ | 3–8 | 0,3–0,4 |
| FeO | <2 | 20–25 |
| CaO | 12–17 | 8–15 |
| $Al_2O_3$ | 29–33 | 4–6 |
| MgO | 22–25 | 16–20 |
| $SiO_2$ | 19–25 | 35–45 |

The slag produced in a pyrometallurgical process will be produced in hot state, typically having a temperature in excess of 1300° C. It is preferable to deliver the hot slag to the reduction step, reducing the energy requirements of the process.

The material may be enriched with a suitable magnesium material which may be added prior to or during the reduction step. The preferred magnesium material is magnesite which is preferably calcined magnesite.

The preferred alkaline earth metal is calcium and the preferred nonoxidic form is the metal or carbide. The most preferred such reductant is calcium carbide.

The reductant may also include an agent selected from the group consisting of silicon, ferrosilicon, aluminium or an aluminium/silicon alloy. An example of a combination reductant is calcium carbide and silicon.

The use of calcium carbide alone as reductant has the additional advantage that it leads to the formation of an easily separable Mayenite phase ($CaO:Al_2O_3$ of 7:12) in the residue or slag produced during reduction of the material. The Mayenite phase may be separated from the slag and the aluminium recovered therefrom using known procedures.

The reduction step must be carried out in the presence of an inert gas such as argon.

The vaporised magnesium may be collected by methods known in the art such as condensing the vaporised magnesium to the liquid in a carbon crucible and then feeding the liquid into a spinning disc to produce particulate solid magnesium. Preferably, the vaporised magnesium is fed to a condenser where it is converted directly from the vapour to a powder form.

An embodiment of the invention will now be described with reference to the accompanying flow diagram. Referring to this flow diagram, hot slag from a smelting process is fed to a reduction furnace together with calcium carbide under an atmosphere of an inert gas such as argon. The magnesium oxide values in the slag are reduced in the reduction furnace and the magnesium vaporises. The temperature employed in the reduction furnace will vary according to the nature of the slag and the pressure of the inert gas.

The vaporised magnesium passes to a water-cooled condenser where the magnesium is condensed directly from the vapour phase to a solid powder state. The magnesium powder produced will typically have a particle size of between 50 and 200 microns. The magnesium powder collects in the base of the condenser. An overflow outlet is provided for delivery of the magnesium to a collection zone. The magnesium powder is delivered to the collection zone in a form suitable for packaging in drums or the like.

Magnesium fines, i.e. particles of less than 50 microns, are flushed out of the condenser and into the baghouse by a stream of inert gas which passes through the bed of magnesium powder. Magnesium nuclei are introduced from the base of the baghouse into the condenser just above the bed.

The slag from the reduction furnace may be granulated and dewatered and used, for example, in brick or road making. Alternatively, it may be further treated to recover the aluminium values. In particular, the dicalcium silicate present in the slag increases its volume by ten percent on controlled cooling leading to decrepitation of the slag. A large portion of the Mayenite phase which is formed in the slag remains as a coarse fraction. This coarse fraction may be separated by screening and the aluminium values recovered therefrom using procedures known in the art. The fine portion, consisting largely of dicalcium silicate, may be sold as is, or after further treatment to the cement industry for the manufacture of white cement.

Any available precious and base metal values present in the original magnesium rich slag will be reduced to a metal alloy phase which can be recovered separately for future refining.

The alloy phase produced in the reduction furnace may also be collected.

If desired cold slag, silicon and/or calcined magnesite may be introduced into the reduction furnace, as indicated on the flow diagram.

TABLE 1

| RUN No. | COMPOSITION |
|---|---|
| 1* | 1 Slag: 0,13 Magnesite: 0,54CaO$_2$ |
| 2* | 1 Slag: 0,13 Magnesite: 0,16Si + 27CaO$_2$ |
| 3 | 1 Slag: 0,25 Dolomite: 0,11Si |
| 4* | 1 Slag: 0,25 Dolomite: 0,08Si + 0,17CaO$_2$ |
| 5 | 1 Slag: 0,25 Dolomite: 0,08 Magnesite: 0,14Si |
| 6* | 1 Slag: 0,25 Dolomite: 0,08Magnesite: 0,09Si + 0,21CaO$_2$ |
| 7 | 1 Dolomite: 1 Magnesite: 0,29Al + 0,23Si |
| 8 | 1 Dolomite: 0,05 Magnesite: 0,2Alumina:0,14Si |

*Method of the invention

TABLE II

| | RESULTS | | | | | | |
|---|---|---|---|---|---|---|---|
| | MAGNESIUM | CONDENSED POWDER | | | | | |
| RUN No. | RECOVERY % | Mg % | Si % | C % | Mn % | Al % | Ca % |
| A1 | 66,7 | 4,16 | 0,90 | 3,74 | 0,38 | 0,10 | 0,72 |
| A2 | 62,5 | 88,94 | 4,45 | 5,59 | 0,32 | 0,10 | 0,60 |
| A3 | 40,9 | 88,06 | 3,98 | 7,03 | 0,02 | 0,34 | 0,58 |
| A4 | 45,5 | 89,32 | 3,98 | 7,35 | 0,15 | 0,26 | 0,56 |
| A5 | 51,9 | 82,35 | 9,57 | 7,36 | 0,01 | 0,30 | 0,40 |
| A6 | 55,5 | 87,61 | 4,33 | 7,23 | 0,13 | 0,36 | 0,37 |
| A7 | 82,5 | 93,02 | 1,51 | 2,55 | 0,01 | 0,24 | 2,65 |
| A8 | 75,9 | 95,31 | 1,01 | 3,21 | 0,01 | 0,11 | 0,34 |
| B1 | 98,75 | 89,49 | 2,70 | 6,22 | 0,41 | 0,20 | 1,02 |
| B2 | 87,5 | 88,85 | 4,28 | 5,80 | 0,27 | 0,21 | 0,60 |
| B3 | 59,1 | 85,32 | 6,18 | 6,95 | 0,05 | 0,26 | 0,64 |
| B4 | 54,5 | 94,14 | 2,13 | 3,15 | 0,26 | 0,02 | 0,31 |
| B5 | 66,7 | 82,64 | 10,00 | 6,53 | 0,06 | 0,26 | 0,52 |
| B6 | 74,1 | 90,63 | 3,39 | 5,35 | 0,12 | 0,06 | 0,44 |
| B7 | 90,5 | 95,57 | 0,75 | 3,25 | 0,01 | 0,01 | 0,40 |
| B8 | 75,9 | 95,47 | 0,74 | 3,32 | 0,01 | 0,06 | 0,40 |

A = 15 minutes reaction time
B = 25 minutes reaction time

It can be seen from the above that for longer reaction times, the recovery of magnesium from slag using the method of the invention is excellent. Bearing in mind the fact that the slag is used in a hot state with the consequent energy savings, the method of the invention is very cost effective.

We claim:

1. A method of recovering magnesium values from a material containing oxides of magnesium, chromium, aluminum, silicon, iron, and calcium, including the steps of delivering said material and reductant to a reduction stage, said reductant including an alkaline earth metal carbide, heating said material and reductant in said reduction stage in an inert atmosphere to reduce the magnesium oxide and produce vaporized magnesium, feeding vaporized magnesium to a condenser and converting the vaporized magnesium directly to a powder form in said condenser.

2. A method of claim 1 wherein the alkaline earth metal is calcium.

3. A method according to claim 1, wherein said magnesium powder produced has a particle size of between 50 and 200 microns.

4. A method according to claim 1 wherein the inert gas is argon.

5. A method according to claim 1, wherein said reductant includes an agent selected from the group consisting of silicon, ferrosilicon, aluminum and an aluminum/silicon alloy in addition to said alkaline earth metal carbide.

6. A method of claim 1 wherein the reductant is calcium carbide and silicon.

7. A method according to claim 1 wherein the material is a slag material having the following composition:

| Oxide | Quantity (% by weight) |
|---|---|
| Cr$_2$O | 3-8 |
| FeO | <2 |
| CaO | 12-17 |
| Al$_2$O$_3$ | 29-33 |
| MgO | 22-25 |
| SiO$_2$ | 19-25 |

8. A method of claim 1 wherein the material is a slag material having the following composition:

| Oxide | Quantity (% by weight) |
|---|---|
| Cr$_2$O | 0,3-0,4 |
| FeO | 20-25 |
| CaO | 8-15 |
| Al$_2$O$_3$ | 4-6 |
| MgO | 16-20 |
| SiO$_2$ | 35-45 |

9. A method of claim 1 wherein the material is delivered to the reduction step in a hot state.

10. A method of claim 9 wherein the material delivered to the reduction step has a temperature in excess of 1300° C.

11. A method of claim 1 wherein the material is enriched by the addition of magnesite thereto.

12. A method of claim 11 wherein the magnesite is a calcined magnesite.

* * * * *